April 25, 1961 E. D. DUKE 2,981,015
CUTTING BLADE ASSEMBLY FOR SCRAPERS
Filed April 29, 1959 2 Sheets-Sheet 1
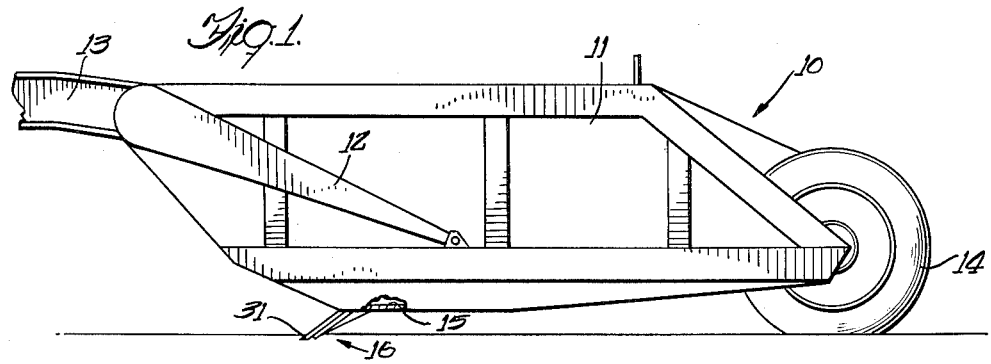
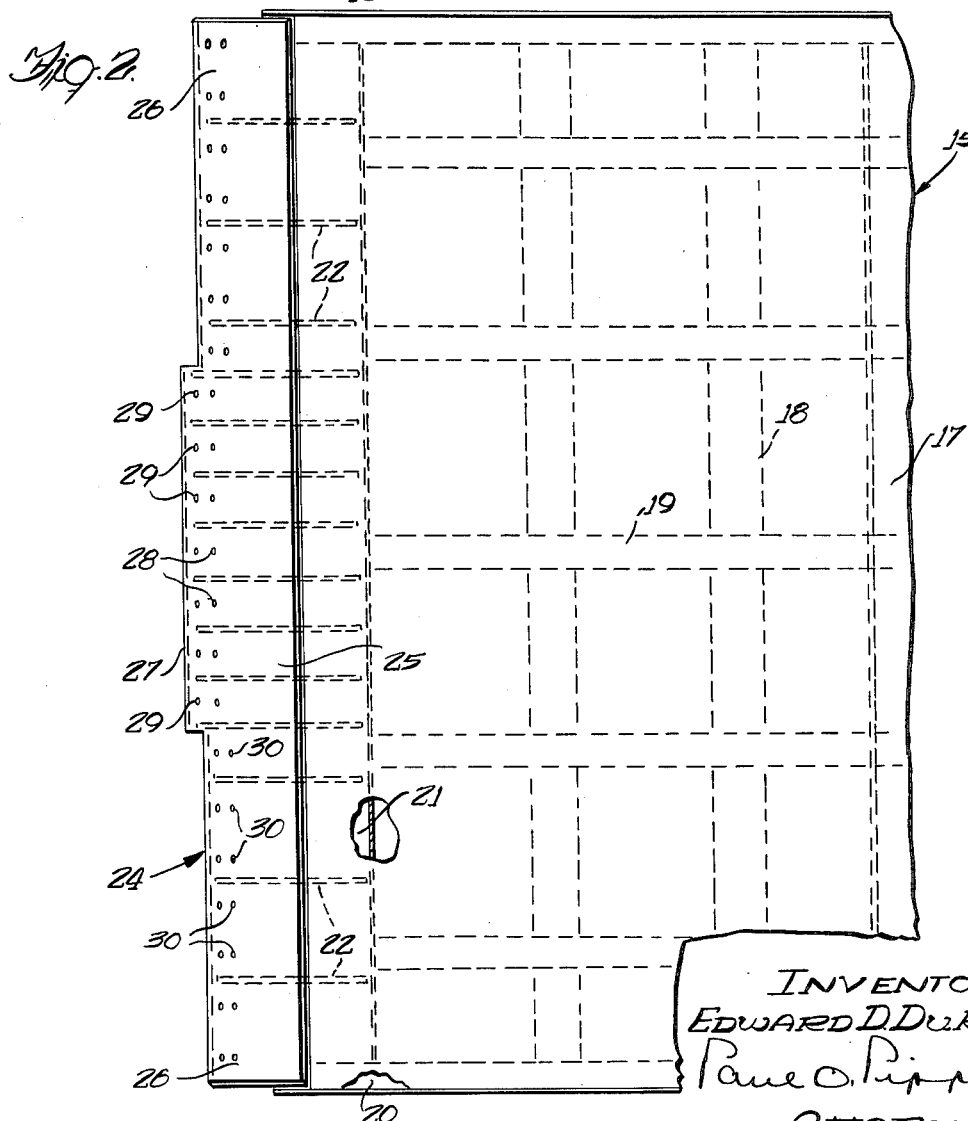
INVENTOR
EDWARD D DUKE
Paul O. Pippel
ATTORNEY April 25, 1961 E. D. DUKE 2,981,015
CUTTING BLADE ASSEMBLY FOR SCRAPERS
Filed April 29, 1959 2 Sheets-Sheet 2
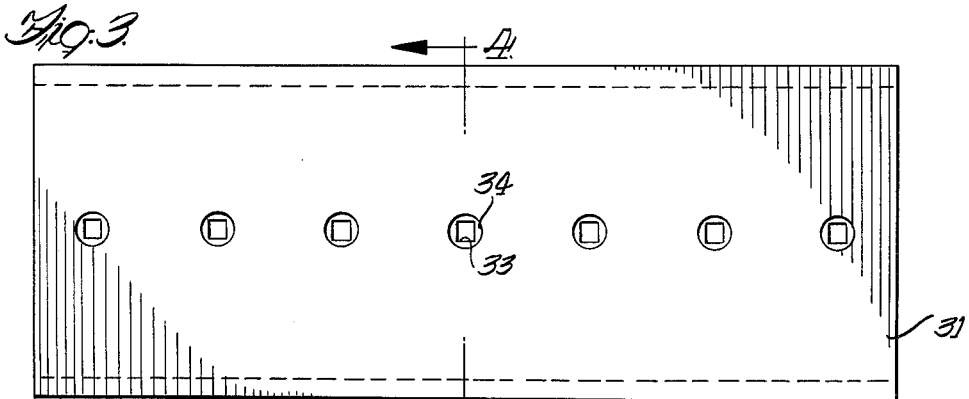
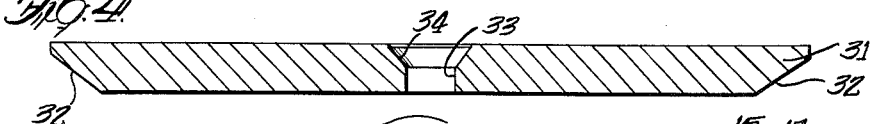
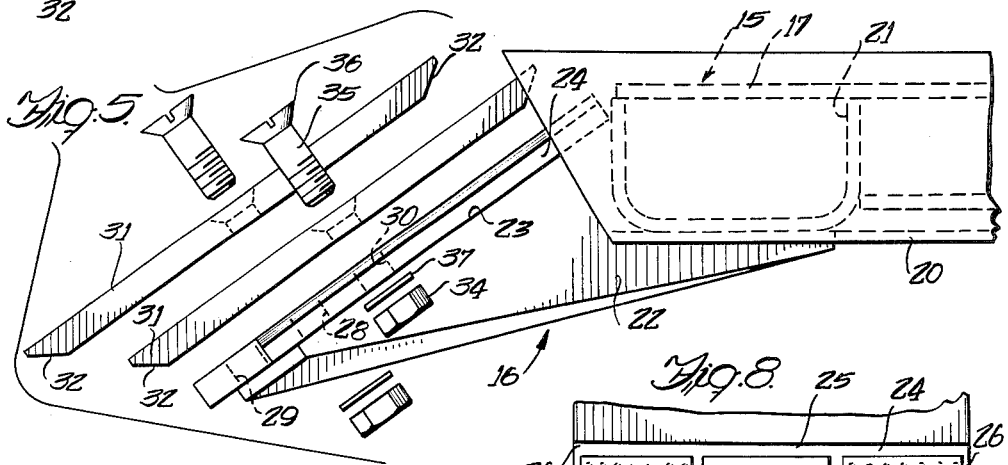
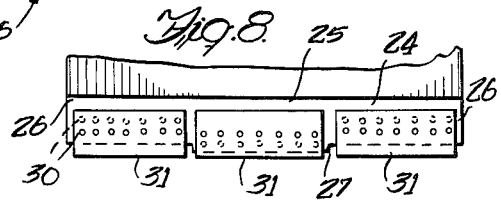
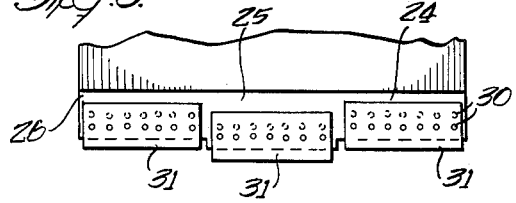
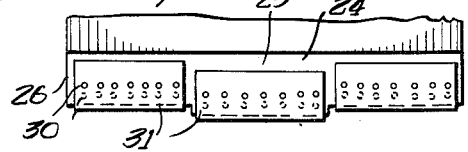
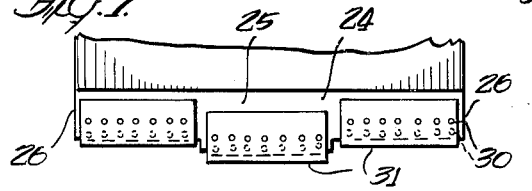
INVENTOR
EDWARD D. DUKE
ATTORNEY

United States Patent Office 2,981,015
Patented Apr. 25, 1961

2,981,015
CUTTING BLADE ASSEMBLY FOR SCRAPERS
Edward D. Duke, Chicago, Ill., assignor to International Harvester Company, Chicago, Ill., a corporation of New Jersey Filed Apr. 29, 1959, Ser. No. 809,681
1 Claim. (Cl. 37—141)

This invention relates to earth moving machinery and particularly to a scraper. More specifically the invention relates to an earth cutting blade assembly particularly adapted for a scraper.

It is a primary object of this invention to provide an improved scraper cutting blade assembly having a plurality of cutting blades which may be adjustably positioned in a variety of positions.

A still further object is the provision of a cutting blade assembly including a plurality of double-edged cutting blades which can easily be interchanged to secure the maximum use of the double-edge construction.

A still further object is the provision of an improved cutting blade assembly for scrappers, the said assembly permitting a center blade to be positioned in a forward cutting position ahead of laterally disposed cutting blades.

A still further object is the provision of an improved cutting blade assembly including a plurality of cutting blades and a blade support, the said blades and support having locating means thereon which permit each of the blades to be adjusted to at least two positions with respect to the blade support.

A still further object is the provision of a scrapper cutting blade assembly including a blade support having locating means positioned thereon which permit the quick interchange of a plurality of cutting blades with a single full width blade if such blade is desired.

A still further object of the invention is the provision of a quick interchangeable arrangement for a plurality of cutting blades of a scraper blade assembly whereby the cutting blades may be quickly changed or reversed if the edges of such blades become worn or damaged.

These and further objects will become more readily apparent from a reading of the specification when examined in connection with the accompanying sheets of drawings.

In the drawings:
Fig. 1 is a side elevational view of an earth moving scraper of relatively conventional construction having an improved cutting blade assembly;
Fig. 2 is a plan view of a portion of a floor of a scraper showing at its forward end a blade support arrangement;
Fig. 3 is a plan view of a scraper blade showing a locating and attaching arrangement;
Fig. 4 is a cross-sectional view along the line 4—4 of Fig. 3;
Fig. 5 is an exploded view of a plurality of scraper blades and connecting elements shown in relation to a blade support; and
Figs. 6, 7, 8 and 9 are plan views in schematic form showing portions of a scraper floor, scraper support plate, and a plurality of cutting blades positioned in a variety of earth-working positions which may readily be achieved by the invention.

Referring now particularly to Fig. 1, an earth-working scraper is generally designated by the reference character 10. The earth-working scraper 10 comprises a bowl 11 having connected thereto conventional draft arms 12 in turn connected to a gooseneck 13 which in turn may be suitably supported on a tractor (not shown). The scraper 10 is supported at its rear by means of a plurality of ground wheels 14, only one of which is shown. The scraper 10, as best shown in Figs. 1 and 2, includes a bottom 15 and a blade supporting structure generally designated at 16. The bottom 15 comprises a flat metal plate 17 suitably supported on transversely and longitudinally extending stringers respectively designated at 18 and 19. Longitudinally extending side members 20 are provided on opposite sides of the bottom 15.

As best shown in Figs. 2 and 4, a U-shaped cross member 21 also extends undernearth the bottom 15 and is suitably connected thereto. The U-shaped cross member 21 has connected thereto a plurality of triangularly shaped brackets 22 which project forwardly with respect to the bottom 15, the said brackets 22 being laterally spaced. Each of the brackets 22 includes an upper sloping surface 23. A transversely extending base plate 24 is suitably connected to the surfaces 23 by means of welding or other securing means. The base plate 24 comprises a center section 25 integrally formed with laterally spaced side sections 26 projecting laterally on opposite sides of the center section 25. The center section 25 also includes a projecting portion 27 protruding forwardly from the center section 25.

As best shown in Fig. 2, locating means on the base plate 24 comprise a first row of holes 28, the said holes extending substantially vertically through the base plate. A second row of holes 29 extend vertically through the projecting portion 27. The first and second rows of holes 28 and 29 are laterally spaced, longitudinally aligned and extend transversely with respect to the base plate 24. A third row of holes 30 is provided in each of the side sections 26, the said third row of holes 30 terminating short of the center section 25. The holes 30 are disposed in parallel relation to the holes 28 and are also longitudinally in alignment therewith. As best shown in Fig. 2, the holes 28 extend completely across the support plate 24 and the holes 29 are disposed forwardly of the holes 28 through the projecting portion 27.

Referring now particularly to Figs. 3, 4 and 5, a blade is designated at 31. As can be seen in Figs. 6, 7, 8 and 9, each support plate 24 supports three of the blades 31. Each blade 31 is double-edged in that it is provided with opposed tapered cutting edges 32. Each blade also includes a row of holes 33, the said holes 33, as best shown in Fig. 3, being provided with a countersunk recess 34, each of said holes being of square construction to accommodate the square shank of a screw 35 having a tapered head 36. The screw 35 provides securing and aligning means for the blades 31 and the blades are suitably connected to the support plate 24 by means of the screws 35, washers 37 and nuts 38. As seen in Fig. 3, the row of holes 33 extends transversely of the blade 31, the said row being spaced equidistant from the opposed cutting edges 32 of the blade.

The manner in which the blades 31 are connected to the support plate 24 is adequately illustrated in Fig. 5. Figs. 6, 7, 8 and 9 show the various positions in which the blades are secured for conventional earth-moving operation. In Fig. 6 the center blade 31 is positioned in its most forwardly extended position and this is also the case in Fig. 7 with respect to the center blade. In Fig. 6 the blades 31 which are positioned laterally with respect to the projecting center blades are also positioned in their forwardmost position in that the screws project through the holes 28. In Fig. 7 the blades which are positioned to the sides of the center blade have their holes in alignment with the holes 30 so that the forward edges of the blades on the side have a minimum projection with respect to the forward edge of the support plate 24. In Fig. 8 the center blade 31 is positioned in its rearwardmost position and the blades on the side are positioned at their forwardmost position so that a completely straight edge is achieved by the three blades. In Fig. 9 the center blade is positioned in its rearmost position as well as the side blades so that only a small portion of each blade projects forwardly of the forward edge of the support plate 24 though the center blade 31 is projecting forwardly with respect to the side plates 31. Thus it is obvious that each of the blades 31 may be positioned in at least two positions with respect to the support plate 24. While Figs. 6 through 9 show a variety of positions most generally utilized, it of course can be appreciated that additional arrangements can be readily effected depending upon the type of cutting action that is desired by the blade assembly. For instance, referring to Fig. 8, either the blade on the left-hand side or the right-hand side could be moved rearwardly so that one blade would have its cutting edge disposed rearwardly with respect to the other two blades 31. Under certain conditions such an arrangement might be desired. By virtue of the screw and nut connection thus the blades may readily be changed to these various positions or may be completely turned so that either of the cutting edges 32 can be utilized. The advantages of the arrangement shown in the disclosure therefore permit a flexibility in earthworking operation which will accommodate a maximum of varying conditions.

It is believed that the objects of the invention have been fully achieved and that changes and modifications may be made which do not depart from the spirit of the invention as disclosed or the scope thereof as defined in the appended claim.

What is claimed is:

An earth cutting assembly for a scraper comprising a base plate, said base plate having a center section having a projecting portion and side sections disposed laterally outwardly from said center section; blade locating means on said plate sections, said locating means being a first row of laterally spaced substantially vertical holes extending in transversely aligned relation across said center and side sections, a second row of laterally spaced substantially vertical holes in said projecting portion, said second row being parallel to said first row and longitudinally aligned with holes of said first row, a third row of vertical holes in said side sections, said holes of said third row being parallel to said first row; a plurality of identical blades, at least one for each section, said blades each having opposed transversely extending cutting edges, each blade having one row of substantially vertical transversely extending holes parallel to one of said cutting edges and being positioned equidistant from said cutting edges, certain of said holes of said blades registering with certain of said holes of said blade locating means whereby a certain cutting configuration is obtained, and means attaching and aligning said blades to said base plate whereby either of said cutting edges of each blade may be placed in operative position at the same location in said configuration to maintain said cutting configuration, and whereby each blade may be adjustably attached in at least two operating positions relative to said base plate.

References Cited in the file of this patent

UNITED STATES PATENTS

| | | |
|---|---|---|
| 2,329,831 | Ferguson | Sept. 21, 1943 |
| 2,778,129 | Fryer | Jan. 22, 1957 |